US008352811B2

United States Patent
Casey et al.

(10) Patent No.: US 8,352,811 B2
(45) Date of Patent: Jan. 8, 2013

(54) METHOD AND APPARATUS FOR REDUCING POSITRON EMISSION TOMOGRAPHY (PET) EVENT LOSSES BY EFFECTIVE BANDWIDTH UTILIZATION

(75) Inventors: Michael E. Casey, Louisville, TN (US); Andrew P. Moor, Knoxville, TN (US); Kenneth Puterbaugh, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 760 days.

(21) Appl. No.: 12/560,048

(22) Filed: Sep. 15, 2009

(65) Prior Publication Data
US 2010/0070808 A1    Mar. 18, 2010

Related U.S. Application Data

(60) Provisional application No. 61/096,977, filed on Sep. 15, 2008.

(51) Int. Cl.
*G06F 11/07* (2006.01)
*G06F 11/25* (2006.01)

(52) U.S. Cl. .......................................... 714/704; 714/48
(58) Field of Classification Search .................. None
See application file for complete search history.

(56) References Cited

U.S. PATENT DOCUMENTS

| 5,241,181 A | 8/1993 | Mertens et al. | |
|---|---|---|---|
| 2005/0031293 A1* | 2/2005 | Kim et al. | 385/146 |
| 2005/0253074 A1* | 11/2005 | Jones et al. | 250/363.04 |

OTHER PUBLICATIONS

Wassenaar, "PET Detector Quality Assurance Using 137 Cs Singles Transmission Imaging", IEEE Transactions on nuclear science, vol. 53, No. 1, Feb. 2006, pp. 108-112.*

* cited by examiner

*Primary Examiner* — Ajay Bhatia
*Assistant Examiner* — Dipakkumar Gandhi
(74) *Attorney, Agent, or Firm* — Peter Kendall

(57) ABSTRACT

An event data transmission scheme is provided for reducing positron emission tomography event losses. The event data transmission scheme employs a more effective use of available data bandwidth. Each of a plurality of detector data slots is connected directly to a data aggregation control interface, and the control interface is connected to a coincidence processor.

7 Claims, 2 Drawing Sheets

METHOD AND APPARATUS FOR REDUCING POSITRON EMISSION TOMOGRAPHY (PET) EVENT LOSSES BY EFFECTIVE BANDWIDTH UTILIZATION

CROSS-REFERENCES TO RELATED APPLICATIONS

This application claims benefit under 35 U.S.C. §119(e) to U.S. Provisional Patent Application Ser. No. 61/096,977 filed on Sep. 15, 2008, which is hereby incorporated by reference in its entirety.

FIELD

The following relates to positron emission tomography (PET) scanners, and more particularly to methods and apparatus for reducing event losses in PET.

BACKGROUND

Positron emission tomography (PET) scanners measure annihilation events. An annihilation event occurs when a positron emitted from a radionuclide encounters an electron and the positron and electron are converted into two photons. An image can be created based on data indicating the number of annihilation events at each location in a scanner's field of view. A PET scanner detects the annihilation events using a scintillator and light sensor. Data from a group or "bank" of PET detectors is generally aggregated into a single data path with each detector occupying a specific "slot" for efficient transmission to a coincidence processor. Within an individual bank, data can be daisy chained, or connected in series, from slot to slot, until the last slot is reached. Data that has reached the last slot or was generated in the last slot is then transmitted to the coincidence processor for further processing. Event losses occur in a daisy-chained scheme if one or more slots contain an event during the same sync period. Only one event can be transmitted along the daisy chain in a single sync period, which requires any additional events to be discarded. These types of event losses are especially prevalent at higher count rates as more events occur per sync period, which increases the probability of events being discarded.

A need exists, therefore, for an event data transmission scheme for reducing PET event losses, employing a more effective use of available data bandwidth.

SUMMARY

As introduced above, one embodiment can provide an event data transmission apparatus for reducing PET event losses. The apparatus can include one or more detector data aggregation banks. The event data transmission apparatus can have two detector data aggregation banks. Each bank can have one or more detector data slots. Each slot can be connected to a data aggregation control interface. The control interface can be connected to a coincidence processor. The control interface can include a field-programmable gate array. The event data transmission apparatus can provide a Noise Equivalent Count Rate measured according to NEMA 2007 protocol that exceeds by greater than or equal to 10% or by greater than or equal to 15% the Noise Equivalent Count Rate measured according to NEMA 2007 protocol of an event data transmission apparatus wherein slots are connected in series.

Another embodiment can provide a method for reducing event data transmission losses. The method can include connecting each of a plurality of detector data slots of one or more detector data aggregation banks to a control interface, and connecting the control interface to a coincidence processor. The control interface can include a field-programmable gate array. The method can provide a Noise Equivalent Count Rate measured according to NEMA 2007 protocol that exceeds by greater than or equal to 10% or by greater than or equal to 15% the Noise Equivalent Count Rate measured according to NEMA 2007 protocol of an event data transmission apparatus wherein slots are connected in series.

Many other aspects and examples will become apparent from the following disclosure.

BRIEF DESCRIPTION OF THE DRAWINGS

Various aspects, examples, and inventive embodiments, are illustrated in the following figures.

Figure 1:
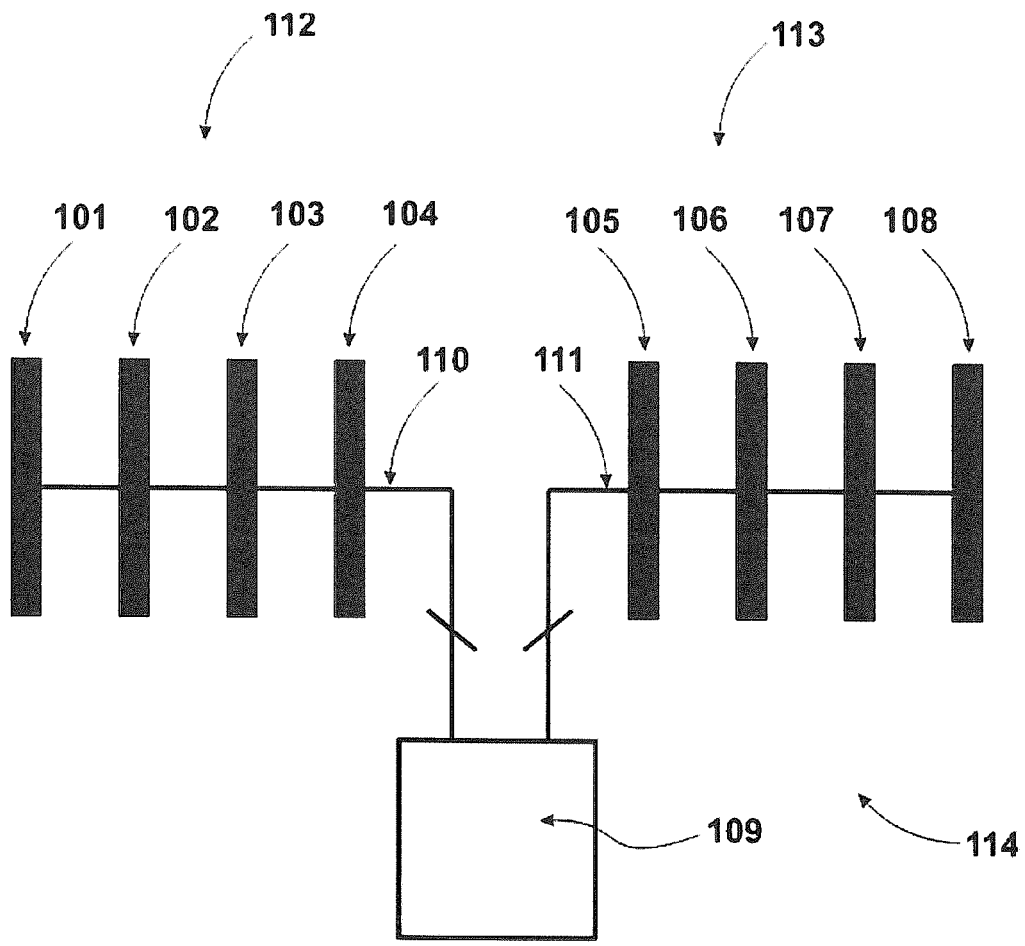
FIG. 1 depicts a schematic of two parallel 4-1 aggregators using a daisy-chain scheme by which a PET scanner can transmit data from detector banks to a coincidence processor.

It should be understood that the various embodiments are not limited to the arrangements and instrumentality shown in the drawings.

DETAILED DESCRIPTION

The functions described as being performed at various components can be performed at other components, and the various components can be combined and/or separated. Other modifications can also be made.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. Numerical ranges include all values within the range. For example, a range of from 1 to 10 supports, discloses, and includes the range of from 5 to 9. Similarly, a range of at least 15 supports, discloses, and includes the range of at least 10.

Thus, the following disclosure describes an event data transmission scheme for reducing PET event losses, employing a more effective use of available data bandwidth. The event data transmission scheme reduces the number of PET events lost during a patient scan and results in a higher Noise Equivalent Count rate. Many other examples and other characteristics will become apparent from the following description.

Referring to FIG. 1, a schematic of two parallel 4-1 aggregators is shown. According to the daisy-chain scheme shown in FIG. 1, a PET scanner can transmit data from the first bank 112 and/or from the second bank 113 to a coincidence processor 109 via connections 110 and 111. In this embodiment, each bank may contain up to four slots. First bank 112 includes a plurality of slots 101, 102, 103, and 104. Second bank 113 includes a plurality of slots 105, 106, 107, and 108. In an individual bank, data is daisy chained from slot to slot, until the last slot is reached. Data that has reached the last slot or was generated in the last slot is then transmitted to the coincidence processor 109 for further processing. This data transmission occurs in both banks simultaneously.

All data is transmitted during a fixed-interval sync period. Event losses occur, if a slot detects an event during the same sync period that a daisy chained event is also present. Only one event can be transmitted along the daisy chain in a single sync period, which requires any additional events to be discarded. For example, if an event occurs in slot 101, the event requires four sync periods to be transmitted to the coincidence processor. After two sync periods the event from slot 101 would now be present in slot 103, and waiting for the next sync period to be transmitted to slot 104. If an event occurs in slot 103 before the daisy-chained event can be transmitted to slot 104, an event loss will occur. This process is the same for both banks Only one event per bank can be transmitted to the coincidence processor per sync period. These types of event losses are especially prevalent at higher count rates as more events occur per sync period, which increases the probability of events being discarded.

Figure 2:
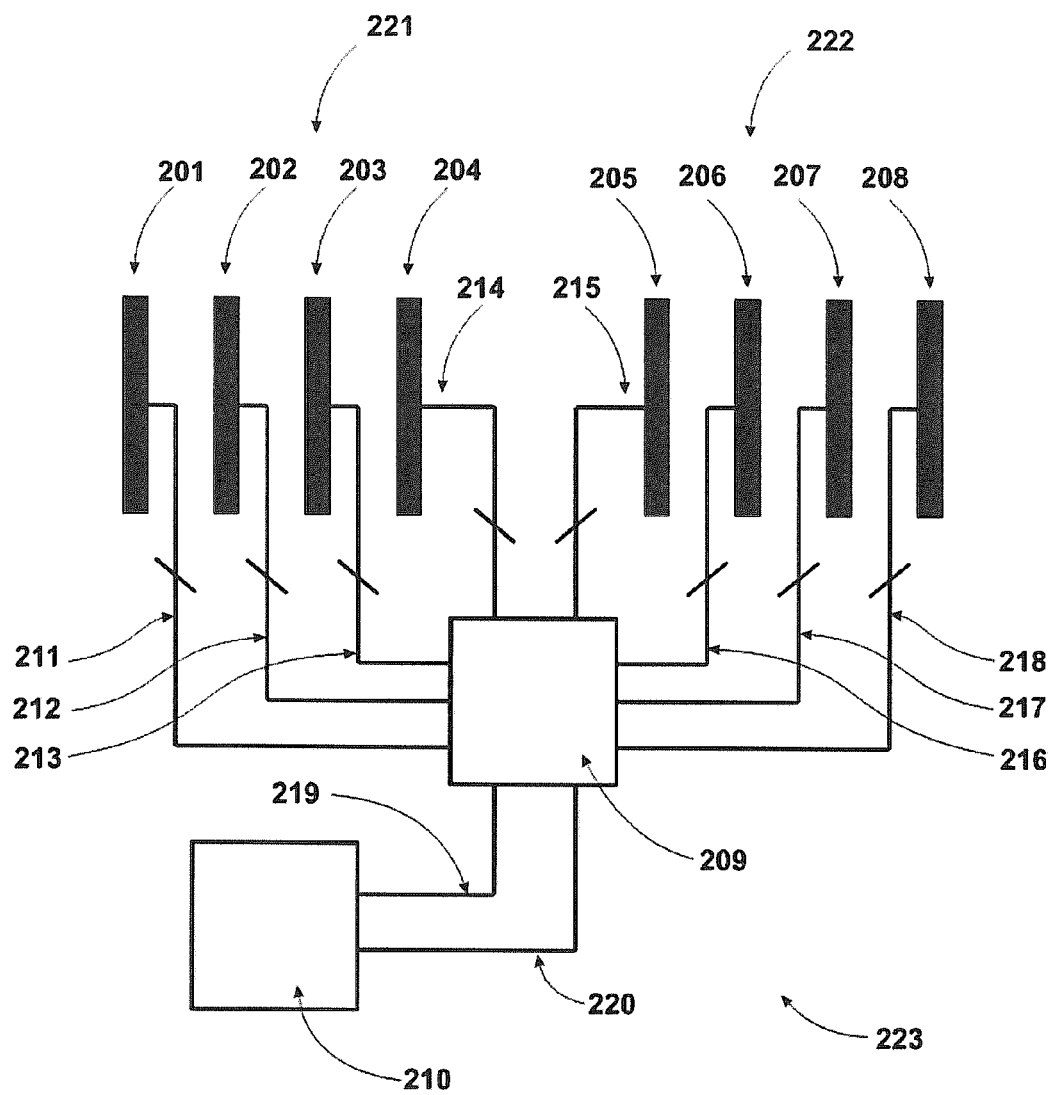
FIG. 2 depicts a schematic of an event data transmission scheme for reducing PET event losses.

Referring to FIG. 2, an event data transmission scheme for reducing PET event losses is shown. According to the aggregation scheme shown in FIG. 2, a PET scanner can transmit data from the first bank 221 and/or from the second bank 222 to an event aggregator control interface 209. Event data can then be transmitted from control interface 209 to coincidence processor 210 via connections 219 and/or 220.

First bank 221 can include a plurality of slots 201, 202, 203, and 204. Second bank 222 can include a plurality of slots 205, 206, 207, and 208. Slot 201 can be connected to control interface 209 via connection 211. Slot 202 can be connected to control interface 209 via connection 212. Slot 203 can be connected to control interface 209 via connection 213. Slot 204 can be connected to control interface 209 via connection 214. Slot 205 can be connected to control interface 209 via connection 215. Slot 206 can be connected to control interface 209 via connection 216. Slot 207 can be connected to control interface 209 via connection 217. Slot 208 can be connected to control interface 209 via connection 218. In other words, instead of event data being daisy chained from slot to slot as in FIG. 1, the event data from each slot is transmitted to a field-programmable gate array (FPGA) on control interface assembly 209. If there is only one event in one bank or one event in each bank during the same sync period, then no improvement is observed. However, if there are two events in the same bank during the same sync period and no events in the other bank, no losses occur and both events are transmitted to the coincidence processor allowing a more efficient use of the available bandwidth. An estimate of the expected increase in NEC due to the new method is greater than 10%.

Providing additional data channels from the FPGA to the coincidence processor can reduce losses even further. For example, but not limitation, adding a third data channel allows for three events to be transmitted per sync period and a fourth would allow four events per sync period to be transmitted to the coincidence processor.

EXAMPLES

Noise Equivalent Count Rate is a NEMA protocol that can be used to evaluate event losses on a PET scanner. Noise Equivalent Count Rate (NEC) is a measure of signal to noise ratio and is defined as the net true events squared divided by the total events (true events+random events+scatter). Equation 1 provides the equation for NEC. From Equation 1 it can be seen that reducing the number of event losses leads to an increase in NEC.

$$NEC = \frac{T^2}{TOTAL}.$$ Equation 1

Comparative Example: NEC NEMA 2007 measurements were taken on a gantry using the scheme shown in FIG. 1.

Inventive Example: NEC NEMA 2007 measurements were taken on the gantry of the comparative example, but using the scheme shown in FIG. 2.

The results for peak NEC are shown in Table 1.

TABLE 1

| NEMA 2007 Count Rate | Value |
| --- | --- |
| Comparative Example | 154,882 |
| Inventive Example | 178,869 |
| Percentage Increase | 15.49% |

Conclusion

The inventive example successfully reduced event losses, leading to an increase in Peak NEC of greater than 15%, exceeding expectations. By making more efficient use of the available bandwidth, many advantages can be achieved. For example, but not limitation: a patient could be scanned in a shorter amount of time given the same dose; the patient could be allowed a lower dose; and/or more events could be captured during very high count rate studies such as cardiac scans leading to improved image quality.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways. Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

We claim:

1. An event data transmission apparatus for reducing PET event losses, the apparatus comprising one or more detector data aggregation banks, each bank having one or more detector data slots, wherein each slot is connected to a data aggregation control interface, and wherein the control interface is connected to a coincidence processor, wherein the coincidence processor provides a Noise Equivalent Count Rate measured according to NEMA 2007 protocol that exceeds by greater than or equal to 10% the Noise Equivalent Count Rate measured according to NEMA 2007 protocol of an event data transmission apparatus wherein slots are connected in series.

2. The event data transmission apparatus according to claim 1, comprising two detector data aggregation banks.

3. The event data transmission apparatus according to claim 1, wherein the control interface comprises a field-programmable gate array.

4. The event data transmission apparatus according to claim 1, providing a Noise Equivalent Count Rate measured according to NEMA 2007 protocol that exceeds by greater than or equal to 15% the Noise Equivalent Count Rate measured according to NEMA 2007 protocol of an event data transmission apparatus wherein slots are connected in series.

5. A method for reducing event data transmission losses comprising connecting each of a plurality of detector data slots of one or more detector data aggregation banks to a control interface, and connecting the control interface to a coincidence processor; and providing a Noise Equivalent Count Rate measured according to NEMA 2007 protocol that exceeds by greater than or equal to 10% the Noise Equivalent Count Rate measured according to NEMA 2007 protocol of an event data transmission apparatus wherein slots are connected in series.

6. The method according to claim 5, wherein the control interface comprises a field-programmable gate array.

7. The method according to claim 5, providing a Noise Equivalent Count Rate measured according to NEMA 2007 protocol that exceeds by greater than or equal to 15% the Noise Equivalent Count Rate measured according to NEMA 2007 protocol of an event data transmission apparatus wherein slots are connected in series.

\* \* \* \* \*